United States Patent [19]
Ando et al.

[11] Patent Number: 5,864,808
[45] Date of Patent: Jan. 26, 1999

[54] ERRONEOUS INPUT PROCESSING METHOD AND APPARATUS IN INFORMATION PROCESSING SYSTEM USING COMPOSITE INPUT

[75] Inventors: Haru Ando; Hideaki Kikuchi, both of Kokubunji; Nobuo Hataoka, Kanagawa-ken; Yasumasa Matsuda, Tokyo; Shigeto Oheda, Kamakura; Tsukasa Hasegawa, Hiratsuka, all of Japan

[73] Assignee: Hitachi, Ltd., Tokyo, Japan

[21] Appl. No.: 935,299

[22] Filed: Sep. 22, 1997

Related U.S. Application Data

[63] Continuation of Ser. No. 426,264, Apr. 21, 1995, abandoned.

[30]   Foreign Application Priority Data

Apr. 25, 1994 [JP]  Japan .................................. 6-0086168

[51] Int. Cl.⁶ ........................................................ G10L 9/00
[52] U.S. Cl. .......................... 704/251; 704/275; 704/276; 704/231; 704/211
[58] Field of Search .................................. 704/275, 276, 704/251, 231, 211

[56]               References Cited

U.S. PATENT DOCUMENTS

| | | | |
|---|---|---|---|
| 4,726,065 | 2/1988 | Froessl | 381/41 |
| 4,783,803 | 11/1988 | Baker et al. | 381/42 |
| 4,811,243 | 3/1989 | Racine | 364/520 |
| 5,022,081 | 6/1991 | Hirose et al. | 381/43 |
| 5,027,406 | 6/1991 | Roberts et al. | |
| 5,133,011 | 7/1992 | McKiel, Jr. | |
| 5,231,691 | 7/1993 | Yasuda | 395/2 |
| 5,329,609 | 7/1994 | Sanada et al. | 395/2.6 |
| 5,386,494 | 1/1995 | White | 395/2.84 |

FOREIGN PATENT DOCUMENTS 43 17 911 A1  5/1993  Germany .
6-68140  11/1994  Japan .

OTHER PUBLICATIONS

"Elements of Voice Information Processing" by Saito et al, OHMsha Ltd., 1981, no translation.

Study of the Grammar to Accept Colloquial Speech in Information Retrieval System, Kitahara et al, Acoustical Society of Japan, 3–5–7, 1991, no translation.

"Mechanical Translation System of KANA Representations to KANJI-KANO" Mixed Representations, Aizawa et al, NHK Technical Report, 25, 5, 1983, no translation.

Primary Examiner—David R. Hudspeth
Assistant Examiner—Vijay B. Chawan
Attorney, Agent, or Firm—Antonelli, Terry, Stout & Kraus, LLP

[57]                ABSTRACT

A user inputs voice through a voice recognition program, a microphone and an A/D converter while pointing by use of a pointing gesture, touch pen or the like with reference to an image displayed on a display unit. For the result of recognition of the inputted voice, a processing or display indicated by a candidate having the first rank of reliability of recognition is performed and an indication showing a plurality of candidates having the second rank and the lower ranks than that is displayed in a menu form on a display screen. In the case where there is an error (that is, in the case where the processing or display indicated by the candidate having the first rank is not a processing intended by the user or the user makes an erroneous input), the error is corrected in such a manner that a correct input candidate is selected by a finger, pen or the like from the displayed menu of candidates having the second rank and the lower ranks than that and a processing operation or display associated with the selected candidate is performed again.

22 Claims, 6 Drawing Sheets

| FIGURE NAME NUMBER | NAME OF FIGURE | FIGURE NUMBER | X CENTER COORDI-NATE | Y CENTER COORDI-NATE | LENGTH | WIDTH |
|---|---|---|---|---|---|---|
| 1 | CIRCLE | 5011 | 150 | 250 | 40 | 40 |
|  |  | 5012 | 500 | 200 | 40 | 40 |
| 2 | EQUI-LATERAL TRIANGLE | 5021 | 150 | 350 | 110 | 95 |
|  |  | 5022 | 420 | 250 | 110 | 95 |
| 3 | RECT-ANGLE | 5031 | 150 | 450 | 80 | 200 |
|  |  | 5032 | 510 | 350 | 80 | 200 |
|  |  | 5033 | 700 | 420 | 50 | 520 |
| 4 |  |  |  |  |  |  |
| ⋮ |  |  |  |  |  |  |
| n |  |  |  |  |  |  |

CONTENTS OF UTTERED VOICE : "KONO EN O KOCHIRA NI COPI SHITE" (COPY THIS CIRCLE TO THIS PLACE)

FIG. 6

| COORDINATE NUMBER | t | x | y |
|---|---|---|---|
| 1 | 50 | 100 | 150 |
| 2 | 51 | 550 | 450 |
| ⋮ | ⋮ | ⋮ | ⋮ |

200 = COORDINATE NUMBER, 201 = t, 202 = x

FIG. 7

| WORD | CONTENT OF WORD | CONCEPT NUMBER |
|---|---|---|
| UTSUSU (TRANSFER) | MOVE | 301~1941 |
| IDOSURU (MOVE) | | |
| FUKUSHASURU (COPY) | COPY | 302~1942 |
| COPISURU (COPY) | | |
| ⋮ | ⋮ | ⋮ |
| EN (CIRCLE) | OBJECT | 501 |
| SANKAKKEI (TRIANGLE) | OBJECT | 502 |
| ⋮ | ⋮ | ⋮ |
| KOCHIRA (THIS PLACE) | POSITION | 901 |

ERRONEOUS INPUT PROCESSING METHOD AND APPARATUS IN INFORMATION PROCESSING SYSTEM USING COMPOSITE INPUT

CROSS-REFERENCE TO RELATED APPLICATION

This is a continuation of application Ser. No. 08/426,264 filed on Apr. 21, 1995, now abandoned.

BACKGROUND OF THE INVENTION

The present invention relates to a user interface such as a graphic editing system using voice or a voice application system having a display screen which is mounted on office automation (OA) equipment such as a personal computer, work station, word processor or the like. The form of input is not limited to the voice and may include an input method in which a directly obtained input signal is taken in a system once and a designated input is then settled through a recognition processing. The present invention provides simple means for processing an unintended error at the time of input in an information processing system which has input means in a composite form including a voice input as input means.

The present invention is directed to the processing of an erroneous input in a processing which uses voice input information and another input information in a composite form. The processing for correction of an erroneous input in such a composite input form does not exist in the prior art. Accordingly, an analogous technique concerning an error processing will now be shown using an example of the processing for correction of an erroneous input in the case where voice input means is used for the input of an instruction.

In the conventional apparatus having a plurality of input means consisting of a voice input, the voice input is merely used in lieu of a keyboard input or the like.

An example of a system using voice input means and performing a processing in accordance with the reliability of recognition of speech includes a ticket vending machine installed at the Shinagawa station of JR East Japan Railway Company which uses a speech recognition input and a touch panel input. The ticket vending machine recognizes inputted speech. In the case where the reliability of recognition of a candidate having the first rank of reliability as the result of recognition of the inputted speech is high, a processing is performed based on a recognized candidate. On the other hand, in the case where the reliability of recognition of the candidate having the first rank of reliability as the result of recognition of the inputted speech is low, an actual ticket issuance processing is performed after the candidate having the first rank of reliability and other candidates have been presented to a user so that the correct result of recognition from the presented candidates is selected by the user through a touch panel input or after a correct indication has been inputted by the user again.

The above-mentioned prior art has a problem that the processing of confirmation for the user must be performed or the input must be made again and hence a considerable time is required for the input of information. Further, there is a problem that even in the case where the reliability of recognition of inputted speech is low but the recognition agrees with the user's intention, the user is requested to confirm the result of recognition of inputted speech, that is, the user is forced to perform a troublesome operation.

Also, in the case where inputted speech is recognized erroneously with a high reliability and a processing started on the basis of the inputted speech has been performed, it is not possible to correct that processing or there are required the cancellation of the entire processing and the succeeding input operation which is to be done over again from the beginning.

SUMMARY OF THE INVENTION

An object of the present invention is to provide an interface for graphic editing, image editing or the like which is for a system in which the indication of an operation is inputted in a composite form using a voice input and another input method (for example, an input indicated by a touch panel, an input using a keyboard or an input using a mouse) and is capable of processing an error in composite input simply without affecting the other input information.

Another object of the present invention is to provide an interface suitable for the use thereof for graphic editing, image editing or the like which is accompanied by a voice input as input means using the recognition of speech.

A further object of the present invention is to provide an input method and apparatus, in an information processing system using a composite input operation including a voice input and a touch panel input, which is capable of making the correction of a processing simply and rapidly even if a processing contrary to the instruction of an operation to be inputted for the system has been performed due to an operation based on the erroneous recognition of inputted speech.

To that end, the present invention provides an information processing system using voice comprising at least information displaying means for displaying information, position information inputting means for inputting continuous position information by a user through a pointing gesture or the like, voice information inputting means for inputting voice information, storing means for storing the position information and the voice information inputted by the inputting means, standard pattern information storing means for storing at least one of voice standard pattern, word information and grammar information, and voice information analyzing means for determining the reliability of voice inputted by the inputting means by use of the at least one of voice standard pattern, word information and grammar information, the system being provided with error processing means by which in the case where a processing or display determined by a candidate having the first rank of reliability of recognition as the result of recognition of speech is first performed while a menu of plural candidates having the second rank of reliability of recognition and the lower ranks than that as the result of recognition of speech is displayed on a display screen and the processing or display determined by the candidate having the first rank of reliability is erroneous or the user makes an erroneous input, a correct input candidate is selected by a finger, pen or the like from the displayed menu of candidates having the second rank of reliability of recognition and the lower ranks than that so that a processing operation or display associated with the selected candidate is performed again.

In order that it is not required that information other than a voice input and inclusive of pointing information be inputted again at the time of correction in the case where the candidate of recognition of speech is selected, there is provided error processing means for storing pointing information which has already been inputted.

In the case where there is no correct candidate in the displayed menu, error processing means for enabling correction by inputting only necessary information by voice again is provided.

In the case where a speech input is made again, there is provided means by which the candidate having the first rank of reliability of recognition as the result of recognition of speech and the menu-displayed candidates having the second rank of reliability of recognition and the lower ranks than that are eliminated from an object of recognition.

There is provided a function of performing the processing or display determined by the candidate having the first rank of reliability of recognition and displaying the content of the result of recognition itself on the display screen or outputting the content of the result of recognition by speech.

There is provided an image editing system or the like in which an editing operation is performed in such a manner that a user inputs a command such as "ido" (move), "fukusha" (copy) and so forth by voice and indicates an object, a moving position and so forth by a finger, pen or the like, the system being provided with error processing means by which in the case where the input of information is followed by performing an operation based on a command which is a candidate having the first rank of reliability of recognition of speech while displaying a menu of candidates having the second rank of reliability of recognition of speech and the lower ranks than that and the operation based on the candidate having the first rank of reliability of recognition of speech is erroneous or the user makes an erroneous input, information other than voice and inclusive of pointing information having already been inputted is stored so that a selection to the menu-displayed plural candidates having the second rank of reliability of recognition and the lower ranks than that is only made by the finger, pen or the like to perform a processing operation or display associated with the selection again.

The above and further advantages of the present invention will become apparent to those skilled in the art upon reading and understanding the following detailed description of the preferred and alternate embodiments.

BRIEF DESCRIPTION OF THE DRAWINGS

The present invention will be described in conjunction with certain drawings which are for the purpose of merely illustrating the preferred and alternate embodiments of the invention and not for the purpose of limiting the same, and wherein:

FIG. 6 shows an example of the data structure of a pointing area table;

FIG. 7 shows an example of the data structure of a word dictionary;

DESCRIPTION OF THE PREFERRED AND ALTERNATE EMBODIMENTS

Embodiments of the present invention will now be described using the accompanying drawings. The description will be made supposing a graphic editing system in which an input is made in a composite form. However, the present invention is limited to such a system and is generally applicable to a CAD system, image processing system, information retrieval system and so forth.

Figure 1:
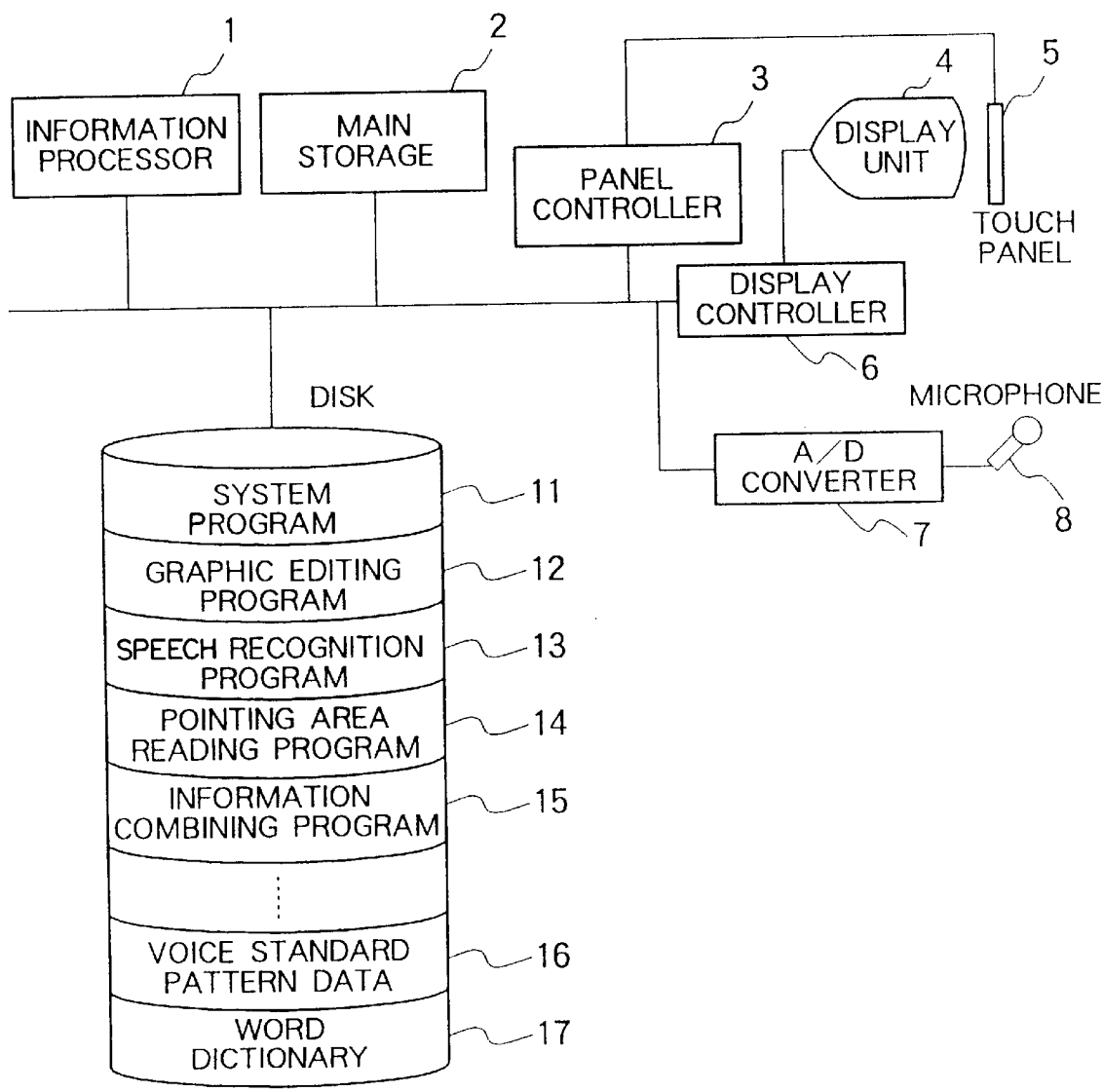
FIG. 1 is a block diagram showing the construction of a system according to the present invention.
Figures 2, 3:
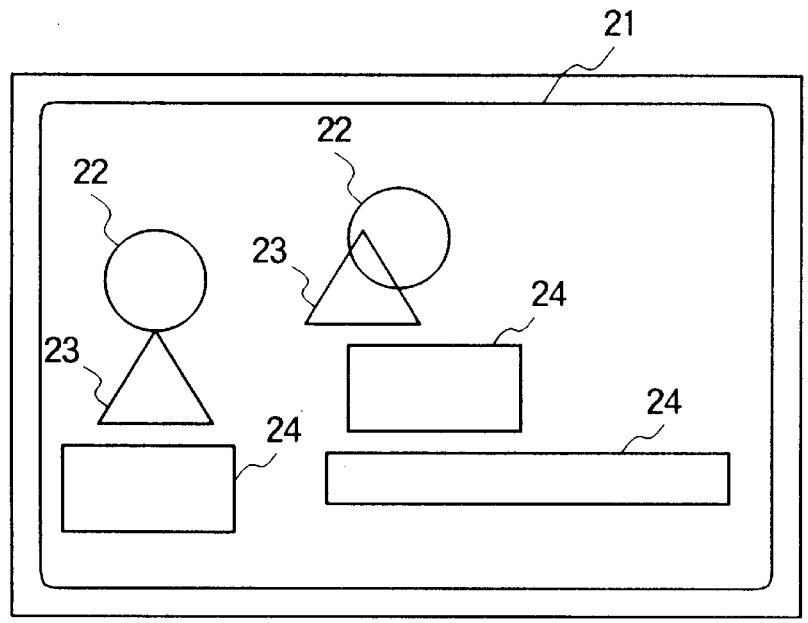
FIG. 2 shows an example of an image displayed on the display screen of a display unit.
FIG. 3 shows an example of a figure depicting table.

FIG. 1 is a block diagram showing an embodiment of the present invention. In FIG. 1, a system program 11, a graphic editing program 12, a speech recognition program 13, a pointing area reading program 14, an information combining program 15, voice standard pattern data 16 and a word dictionary 17 provided in a disk are loaded to a main storage 2 at the time of start-up of the system. FIG. 2 shows an example of an image for graphic editing displayed on a display unit 4 through the graphic editing program 12 loaded to the main storage 2. In FIG. 2, two circles 22, two triangles 23 and three rectangles 24 are depicted or displayed in a graphic mode on a display screen 21 by starting the graphic editing program 12 and referring to a figure depicting table 30 (see FIG. 30) stored in the main storage 2.

In the present invention, a user points at one of displayed objects on the display screen to designate the one object and performs an editing work for the designated object. The editing work is indicated by a voice input. For the editing processing in the system, an information processor 1 first starts the speech recognition program 13 in the main storage 2 and further starts the pointing area reading program 14. The input of position information is possible in such a manner that a pointing operation based on the pointing area reading program 14 is performed on a touch panel 5 disposed corresponding or opposite to the display unit 4. The details of the pointing area reading program 14 will be explained later on. The display unit 4 is controlled by a display controller 6.

Figure 9:
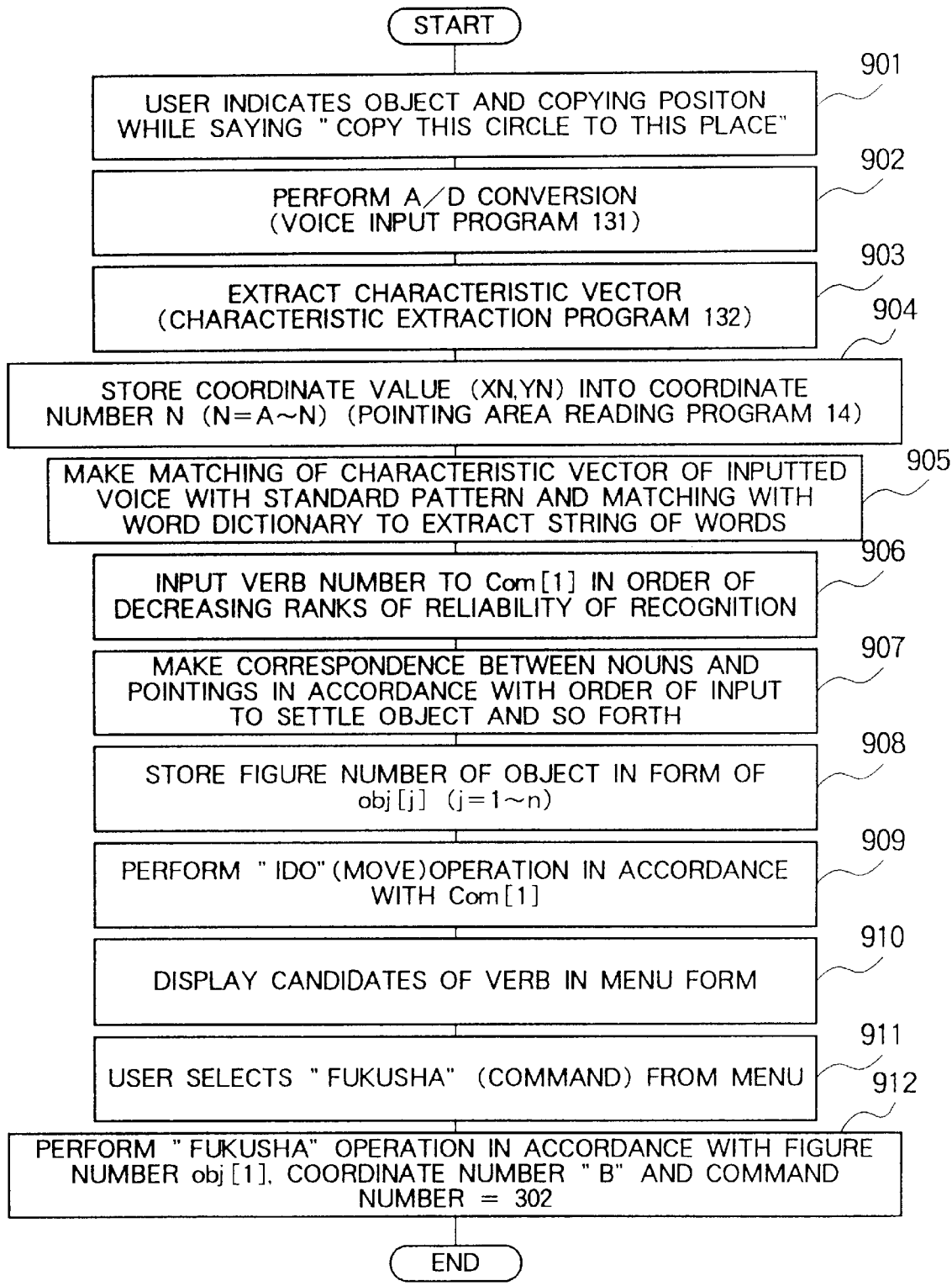
FIG. 9 is a flow chart showing the outline of a processing operation of the present invention.

FIG. 9 is a flow chart showing the outline of an example of the operation of the present invention. Steps shown in FIG. 9 will now be explained successively.

Figure 4:
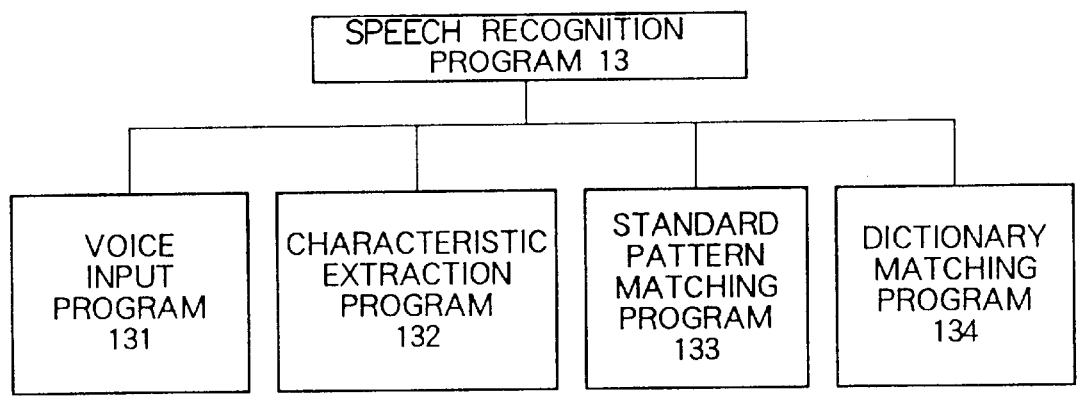
FIG. 4 shows an example of the structure of a speech recognition program.
Figure 5:
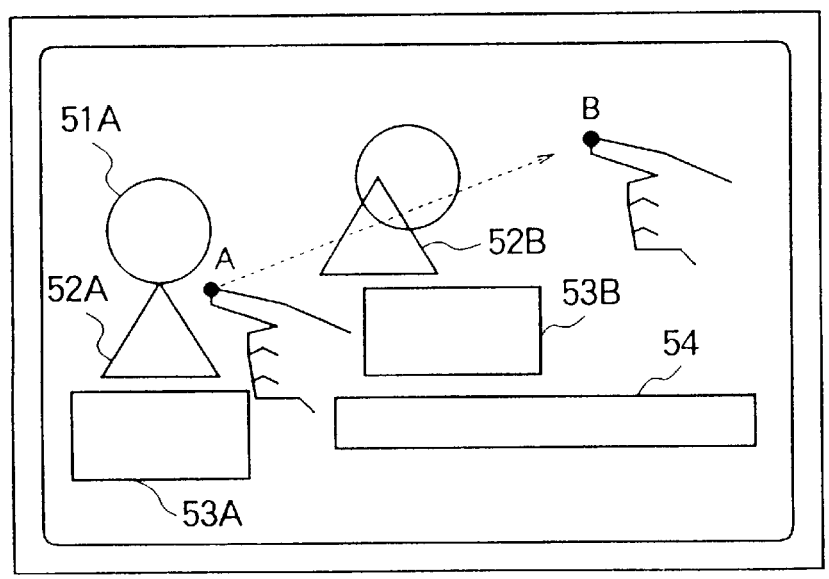
FIG. 5 shows an example of an image displayed on the display screen of the display unit.

As shown in FIG. 4, the speech recognition program 13 includes a voice input program 131, a characteristic (or feature) extraction program 132, a standard pattern matching program 133 and a dictionary matching program 134. With the start of the speech recognition program 13, the voice input program 131 is first started. A user indicates an editing operation by a voice input using a microphone 8 while indicating an object, a moving position and so forth on the touch panel 5 (step 901). Receiving position information inputted from the touch panel 5 and voice information of editing instruction, the graphic editing system understands the user's intention from the received information and performs a graphic editing in accordance with the editing instruction based on the voice information. The present embodiment will be mentioned in conjunction with the case where the user successively indicates a point A in the vicinity of a circle as an object and a point B representative of a copying position while saying "Kono en o kochira ni copi shite" ("Copy this circle to this place" in English representation) for the microphone 8, as shown in FIG. 5. With the start of the voice input program 131, the voice inputted from the microphone 8 is converted by an A/D converter 7 into a digital signal and is thereafter sent to the main storage 2 for subjection to the succeeding processing (step 902). Next, the characteristic extraction program 132 is started so that the digital signal corresponding to the indication by the inputted voice is converted into a time series of LPC cepstrum coefficients as a characteristic (or feature) vector at a frame period of 10 ms (step 903). (An example of conversion of characteristic vector has been disclosed by "ELEMENTS OF VOICE INFORMATION PROCESS- ING" written by Saito and Nakata and published by the OHMsha Ltd., on 1981). At this time, buffer memory P provided in the main storage 2 is reset to zero. Based on the pointing area reading program 14, information of touch coordinates (X, Y), when the finger tip of the user, a pen or the like touch the touch panel 5, is taken in through a panel controller 3. The buffer memory P is incremented each time the coordinate information is taken in. The taken-in coordinate information is written into a pointing area table of the main storage 2. The pointing area table includes array memories X, Y and T. The x-coordinate value of the taken-in coordinate information, the y-coordinate value thereof and the instant of time of input of the coordinate information are written into the array memories X[P], Y[P] and T[P], respectively. As shown in FIG. 6, the pointing area table includes a coordinate number 200, the array memory X 201 in which the x-coordinate value is written, the array memory Y 202 in which the y-coordinate value is written and the array memory T in which the time instant of input of the coordinate information is written. Data of the x-coordinate and y-coordinate of the finger touching the panel and the time instant of input of the coordinate information are stored into the respective memories starting from the coordinate number "1" in the order of input (step 904). When a certain fixed time To lapses after the departure of the finger tip, pen or the like from the touch panel 5, the writing operation is completed. Even in the case where another means is used, the writing operation is similarly completed upon lapse of the fixed time.

Upon completion of the operation in which the coordinate information and the editing instruction inputted through the pointing and utterance by the user are written into the pointing area table, the standard pattern matching program 133 and the dictionary matching program 134 are started. At the time of start of the dictionary matching program 134, the reference to the word dictionary 17 is made. As shown in FIG. 7, the word dictionary 17 includes a word 191, the content of word 192 and a concept number 193. The concept number 193 is an identification number for classifying words which have similar meanings. First, a matching is made between the characteristic vector which is obtained from the inputted voice and the voice standard pattern data 16 which is stored in the system beforehand. The matching can be made using, for example, a method disclosed by Kitahara et al, "EXAMINATION OF COLLOQUIAL SENTENCE ACCEPTING METHOD IN INFORMATION RETRIEVAL SYSTEM USING VOICE INPUT" (Acoustical Society of Japan, 3-5-7 (1991)). As the result of matching, the inputted voice is converted into a string of characters (step 905). An example of the character string is "kono/en/o/kochira/ni/ido/shite" (corresponding to "move/this/circle/to/this/place" in English representation). At this time, the reliability of recognition is determined for each form element (or word partitioned by hyphen "/") to make the ranking of candidates. In addition, the analysis of form elements of the character string obtained by the matching is made using a known method, for example, a longest matching method disclosed by Aizawa et al, "KANA/KANJI TRANSFORMATION USING COMPUTER" (NHK Technical Report, 25, 5 (1973)) and the matching with the word dictionary 17 is made, thereby obtaining form element information such as ("this", demonstrative, 803), ("en", noun, 501), ("o", attached word, 804), ("kochira", noun, 901), ("ni", attached word, 805) and ("idoshite", verb, 301). The verb is provided with a command number Com[i] (i=1 to n) in the order of decreasing ranks of reliability of recognition (that is, the highest rank comes first) (step 906).

Figure 8:
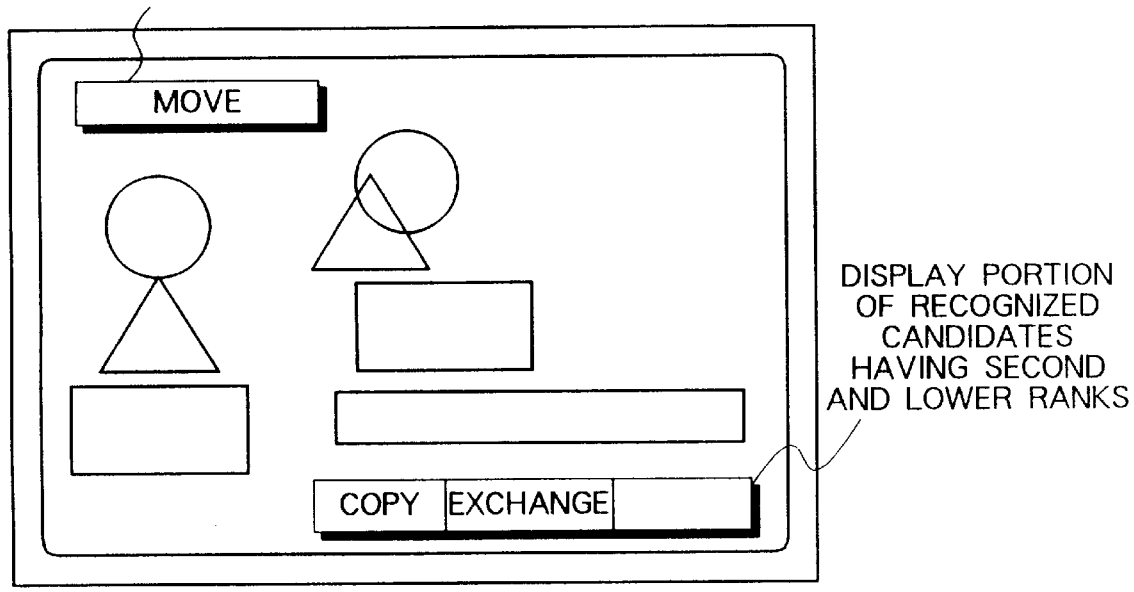
FIG. 8 shows an example of an image displayed on the display screen of the display unit.

In the shown example, "ido" (move) has Com[1]=301. Next, the information combining program 15 is started to make a time correspondence between the order of input of nouns having the concept number of 500's and nouns having the concept number of 900's and the order of input of a plurality of paintings, as disclosed by, for example, Japanese Patent Application No. 04-221234 by Kitahara et al entitled "SYSTEM FOR INPUT IN COMPOSITE FORM" (step 907). In the shown example, since the input of the noun "en" concerning an object is earlier than that of the noun "kochira" concerning a position, the coordinate number A indicates an object and the coordinate number B indicates a moving position. Next, the matching of the concept number (913 in FIG. 7) of the object with three upper digits of a figure number (303 in FIG. 3) in the figure depicting table 30 is made to extract a candidate figure. A candidate figure on the display screen obtained in the present embodiment is extracted as numbers 5011 and 5012 in the figure depicting table 30. Next, a circle having center coordinates nearest to a coordinate number "A" (XA, YA) indicating the position of the object noun obtained from the inputted voice is settled as a figure which is an object of indication, and the contour of that figure is flickered. In the case of the shown example, a circle 51A in FIG. 5 corresponds to the figure number 5011 in FIG. 3 and hence the figure number 5011 is recognized as being the candidate figure. The recognized figure number is sequentially stored in the form of obj[1]=5011 (step 908). Information having already been stored through pointing and concerning the object and the copying position is stored until the next pointing is inputted into the graphic editing area. Next, in the case where the reliability of recognition of candidate of the verb as the form element information is ranked in the order of "ido" (move), "fukusha" (copy) and "kokkan" (or exchange), the command number is inputted as Com[1]=301, Com[2]=302, - - - . First, an "ido" (move) operation of Com[1]=301 having the highest or first rank of recognition of candidate is performed (step 909). The selected circle is moved to the coordinate number "B" (XB, YB) on the main storage 2 which is the indicated position. At this time, the result of the above operation and a command name of the performed operation are displayed on the display screen, as shown in FIG. 8. Further, a menu of candidates of recognition of the inputted voice concerning the operation command and having the second and lower ranks of reliability is displayed on the same display screen (step 910). The number of candidates to be displayed may be limited to a predetermined number or only candidates having a predetermined rank and higher ranks than that may be displayed. In the shown example, the operation command is specified as "ido" (move) on the basis of the verb recognized from the inputted voice. However, in the case where the user actually requests not "ido" (move) but "fukusha" (copy), there results in an erroneous processing which is caused from not the result of an operation desired by the user but the result of recognition of the inputted speech. In that case, therefore, "fukusha" (copy), which is a command intended by the user himself or herself, is selected by the user on the touch panel 5 from the menu of operation command candidates with the second and lower ranks of reliability displayed on the display screen so that the erroneous processing is corrected with a high efficiency (step 911). When an operation command or menu item intended by the user is selected from the candidate menu having the second rank and the lower ranks than that, a coordinate area and a pointing position for each item of the candidate menu are checked to select Com[2]=302. Next, the previously performed "ido" (move) operation is cancelled but commonly available pointing information used at the time of erroneous processing is held in the main storage 2 as it is and the held pointing information can be used again in a processing which is to be performed after correction of the erroneous processing. Using the held pointing information, a "fukusha" (copy) operation is performed in accordance with Com[2]=302 (step 912). As the result of correction of erroneous processing, the object is copied to the coordinate number "B" (XB, YB) on the main storage 2. On the other hand, in the case where no corresponding candidate of the command exists in the displayed menu, only the name of a processing command is inputted by voice again so that the processing command is inputted through a speech recognition processing by use of candidates of recognition excepting the previously displayed candidate having the first rank of reliability of recognition and the previously menu-displayed candidates having the second and lower ranks of reliability of recognition.

In a system of the present invention, as mentioned above, in which a processing is performed using a plurality of inputs in a composite form, the input of only contents to be subjected to correction suffices at the time of correction of erroneous processing, thereby making it possible to save a labor for inputting redundant or duplicative data again. When a voice input is made again, a different or wrong candidate can be eliminated surely, thereby enabling a high-efficient recognition processing.

The present invention provides the following effects.

When a user inputs information by use of voice input means and another input means, a system performs a processing or display determined by a candidate having the first rank of reliability as the result of recognition of speech and displays on a display screen a menu of plural candidates which have the second rank of reliability and the lower ranks than that as the result of recognition of speech. In the case where the processing or display based on the candidate having the first rank of reliability is erroneous or the user makes an erroneous input, an error processing is performed in which a correct input candidate is selected by a finger, pen or the like from the displayed menu of candidates having the second rank of reliability and the lower ranks than that so that a processing operation or display associated with the selected candidate is performed again. As a result, it is possible to perform the error processing simply. Also, in order that it is not required that information other than a voice input and inclusive of pointing information be inputted again at the time of correction in the case where the candidate of recognition of speech is selected, error processing means for storing pointing information having already been inputted is provided. As a result, in the case where the user has inputted information other than voice as well as a voice input, a need to input the correctly inputted information again is eliminated or the input of only erroneous information suffices. Further, in the case where there is no correct candidate in the displayed menu, an error processing for correcting the erroneous recognition is performed in such a manner that the candidate having the first rank of reliability of recognition as the result of recognition of speech and the menu-displayed candidates having the second rank of reliability of recognition and the lower ranks than that are eliminated from an object of recognition and only necessary information is inputted by voice again. As a result, it is possible to improve the reliability of recognition by thus reducing the number of candidates of recognition. Furthermore, in an image editing system or the like in which an editing operation is performed in such a manner that a user inputs a command such as "ido" (move), "fukusha" (copy) and so forth by voice and indicates an object, a moving position and so forth by a finger, pen or the like, information other than voice inclusive of pointing information having already been inputted is stored in the case where the input of information is followed by performing an operation based on a command having the first rank of reliability of recognition of speech while displaying a menu of candidates having the second rank of reliability of recognition of speech and the lower ranks than that and the operation based on the candidate having the first rank of reliability of recognition of speech is erroneous or the user makes an erroneous input. Thereby, it is possible to reduce the number of error processing steps in such a manner that a selection to the menu-displayed plural candidates having the second rank of reliability of recognition and the lower ranks than that is only made by the finger, pen or the like to perform a processing operation or display associated with the selection again. Also, a function of performing the processing or display determined by the candidate having the first rank of reliability of recognition and displaying the content of the result of recognition itself on the display screen or outputting the content of the result of recognition by speech is provided, thereby making it possible for the user to confirm the result of recognition.

The present invention has been described with reference to the preferred and alternate embodiments. Obviously, modifications and alternations will occur to those skilled in the art upon reading and understanding the present invention. It is intended that the invention be construed as including all such modifications and alternations in so far they come with the scope of the appended claims or the equivalent thereof.

We claim:

1. An information processing system using voice comprising:

at least information displaying means for displaying information;

position information inputting means for inputting continuous position information by a user through a pointing gesture;

voice information inputting means for inputting speech information;

storing means for storing the position information inputted by said position information inputting means and the voice information inputted by said voice information inputting means;

standard pattern information storing means for storing at least one of a voice standard pattern, word information, and grammar information;

voice information analyzing means for determining the reliability of voice inputted by said voice information inputting means by use of the at least one of voice standard pattern, word information, and grammar information; and error processing means by which in the case where the information processing system first performs a processing or display determined by a candidate having a first rank of reliability of recognition as the result of recognition of speech while a menu of plural candidates having a second rank of reliability of recognition and lower ranks than the second rank as the result of recognition of speech is displayed on a display screen, and by which if the processing or display determined by the candidate having the first rank of reliability is erroneous or the user makes an erroneous input, a correct input candidate is selected by a pointing device from the displayed menu of candidates having the second rank of reliability of recognition and the lower ranks than the second rank so that the information processing system again performs a processing operation or display associated with the selected candidate.

2. An information processing system using voice according to claim 1, wherein said error processing means stores pointing information having already been inputted by the pointing device in order that it is not required that information other than a voice input and inclusive of pointing information be inputted again at the time of correction in the case where the candidate of recognition of speech is selected by the pointing device.

3. An information processing system using voice according to claim 1, wherein in the case where there is no correct candidate in the displayed menu, said error processing means makes it possible to make correction by inputting only necessary information by voice again.

4. An information processing system using voice according to claim 1, wherein in a case where a voice input is made again, the candidate having the first rank of reliability of recognition as the result of recognition of voice and the menu-displayed candidates having the second rank of reliability of recognition and the lower ranks than the second rank are eliminated from being becoming an object of recognition.

5. An information processing system using voice according to claim 1, wherein the system has a function of performing the processing or display determined by the candidate having the first rank of reliability of recognition and displaying the content of the result of recognition itself on the display screen or outputting the content of the result of recognition by speech.

6. An information processing system using voice in an image editing system which includes the information processing system using voice according to claim 1 and in which an editing operation is performed by inputting an editing command through voice by a user and indicating an object or a moving position, by a pointing device, the system being provided with error processing means by which in the case where the input of information is followed by performing an operation based on a command which is a candidate having the first rank of reliability of recognition of speech while displaying a menu of candidates having the second rank of reliability of recognition of speech and the lower ranks than the second rank and the operation based on the candidate having the first rank of reliability of recognition of speech is erroneous or the user makes an erroneous input, information other than voice and inclusive of pointing information having already been inputted is stored so that a selection to the menu-displayed plural candidates having the second rank of reliability of recognition and the lower ranks than the second rank is only made by the pointing device to perform a processing operation or display associated with the selection again.

7. An erroneous input correcting method in a composite input information processing system, comprising the steps of:

inputting an editing instruction indicative of the modification in shape or change in position of a displayed object by voice while designating the displayed object directly;

storing position information of the object;

recognizing the inputted speech and performing an editing instruction having a first rank of reliability of recognition based on the recognized inputted speech;

displaying the result of performance and a menu of editing instructions having a second rank of reliability of recognition as the result of recognition of speech and lower ranks than the second rank;

selecting a processing instruction of the menu of editing instructions having the second rank of reliability of recognition and the lower ranks than the second rank; and executing said processing instruction for said position information.

8. An information processing system using voice comprising:

information displaying means for displaying information;

position information inputting means for inputting continuous position information by a user through a pointing gesture;

voice information inputting means for inputting voice information representing a desired processing or a desired display;

storing means for storing the position information inputted by the position information inputting means and the voice information inputted by the voice information inputting means;

standard pattern information storing means for storing at least one of a voice standard pattern, word information, and grammar information;

voice information analyzing means for determining a reliability indicating a likelihood of representing the voice information inputted by the voice information inputting means by use of the at least one of a voice standard pattern, word information, and grammar information; and error processing means which
(1) executes first a processing or a display indicated by a candidate having a first rank of reliability as a result of speech recognition of the voice information while displaying a menu of candidates having a second rank and lower ranks of reliability on a display screen of the information displaying means, and
(2) when the processing or the display indicated by the candidate having the first rank of reliability is erroneous, or when the user makes an erroneous input, selects a correct candidate by a human finger or a writing pen from the menu of candidates having the second rank and lower ranks of reliability, and executes a processing or a display indicated by the selected correct candidate.

9. An information processing system using voice according to claim 8, wherein the error processing means stores information already inputted by a pointing gesture of the user other than information inputted by voice so that when the processing indicated by the candidate having the first rank of reliability is erroneous, it is only necessary to select the correct candidate from the displayed menu and execute the processing indicated by the selected candidate without inputting again the information inputted by the pointing gesture of the user.

10. An information processing system using voice according to claim 9, wherein when there is no correct candidate in the displayed menu, the error processing means makes it possible to correct an erroneous processing executed due to the indication by the candidate having the first rank of reliability by inputting only necessary information by voice again to obtain a new candidate as a result of the speech recognition of the inputted voice information.

11. An information processing system using voice according to claim 10, wherein when the voice information is inputted again, the candidate having the first rank of reliability and the candidates having the second rank and lower ranks of reliability in the displayed menu are eliminated from candidates obtained as a result of the speech recognition of the voice information inputted again.

12. An information processing system using voice according to claim 8, further including means for executing the processing or the display indicated by the candidate having the first rank of reliability, and at the same time, displaying the content of the result of the speech recognition itself on the display screen and outputting the content of the result of the speech recognition by voice.

13. An information processing system using voice in an editing system, the information processing system using voice comprising:

information displaying means for displaying information;

editing information inputting means for inputting editing information indicating an editing object and a moving position by a human finger or a writing pen;

voice information inputting means for inputting voice information representing editing commands including at least "move" and "copy";

storing means for storing the editing information inputted by the editing information inputting means and the voice information inputted by the voice information inputting means;

standard pattern information storing means for storing at least one of a voice standard pattern, word information, and grammar information;

voice information analyzing means for determining a reliability indicating a likelihood of representing the voice information inputted by the voice information inputting means by use of the at least one of a voice standard pattern, word information, and grammar information; and error processing means which (1) performs an editing operation, when voice information and editing information are inputted, based on an editing command which is a first candidate of speech recognition, and displays a menu of candidates which are second and following candidates of the speech recognition on a display screen of the information displaying means, and (2) when the editing operation performed based on the editing command which is the first candidate of the speech recognition is erroneous, or when the user makes an erroneous input, stores information already inputted, including the editing information and excluding the voice information, selects an editing command from the menu of the second and following candidates of the speech recognition with the human finger or the writing pen, and executes an editing operation based on the selected editing command.

14. An erroneous input correcting method in a composite input information processing system, the method comprising the steps of:

inputting by voice an editing instruction indicative of a modification in shape or a change in position of a displayed object while designating the displayed object directly;

storing position information of the object;

performing speech recognition of the editing instruction inputted by voice, and executing an editing instruction having a first rank of reliability of recognition which is an editing instruction which is most likely to be representative of the inputted editing instruction;

displaying (1) a result of executing the editing instruction having the first rank of reliability of recognition, and (2) a menu of editing instructions having a second rank and lower ranks of reliability of recognition as a result of recognition of the editing instruction inputted by voice;

selecting an editing instruction from the menu of editing instructions having the second rank and lower ranks of reliability of recognition; and executing the editing instruction selected from the menu for the position information of the object.

15. An information processing system comprising:

speech recognition processing means for recognizing an editing instruction inputted by voice, and determining a plurality of candidates of recognition;

processing means for executing, with respect to an editing object designated by pointing, an editing instruction which is a candidate of recognition having a first rank of reliability among the candidates of recognition; and display means for displaying (1) a processing result of the editing instruction which is the candidate of recognition having the first rank of reliability, and (2) candidates of recognition having a second rank and lower ranks of reliability;

wherein when the processing result of the editing instruction which is the candidate of recognition having the first rank of reliability is erroneous, or when the user makes an erroneous input, the processing means executes, with respect to the editing object, an editing instruction selected from the candidates of recognition having the second rank and lower ranks of reliability displayed by the display means.

16. An information processing system according to claim 15, wherein the processing means stores information of the editing object until the processing result of the executed editing instruction is confirmed to be correct.

17. An information processing system according to claim 16, wherein when the editing instruction is again inputted by voice, the speech recognition processing means excludes the candidate of recognition having the first rank of reliability and the candidates of recognition having the second rank and lower ranks of reliability from candidates of recognition of the editing instruction inputted again, and outputs new candidates of recognition.

18. An information processing method using a speech recognition processing, the method comprising the steps of:

(a) inputting by voice an instruction sentence containing an editing instruction, an editing object, and position information required for editing;

(b) specifying an arbitrary object and an arbitrary position on a display;

(c) performing speech recognition of the instruction sentence, and determining a plurality of candidates of recognition of the editing instruction;

(d) using the object and the position specified in step (b) as the editing object and the position information indicated in step (a), and executing an editing instruction which is a candidate of recognition having a first rank of reliability among the candidates of recognition;

(e) displaying on the display (1) a result of executing the editing instruction which is a candidate of recognition having the first rank of reliability, and (2) the candidates of recognition;

(f) when the result of executing the editing instruction which is the candidate of recognition having the first rank of reliability is erroneous, selecting an editing instruction from the candidates of recognition displayed on the display other than the candidate of recognition having the first rank of reliability; and (g) executing again the instruction sentence inputted in step (a) based on the editing instruction selected in step (f) and the object and the position specified in step (b).

19. An information processing method according to claim 18, wherein in step (f), when the result of executing the editing instruction which is the candidate of recognition having the first rank of reliability is erroneous and there is no desired candidate in the candidates of recognition displayed on the display, a new editing instruction is inputted by voice, and the instruction sentence inputted in step (a) is executed again based on a result of speech recognition of the new editing instruction inputted by voice and the object and the position specified in step (b).

20. An information processing method according to claim 19, wherein at a time of performing speech recognition of the new editing instruction inputted by voice, the candidates of recognition determined in step (c) are excluded from candidates of recognition of the new editing instruction inputted by voice.

21. An information processing system using voice comprising:

a display;

a pointing device; and a control device which recognizes a plurality of candidates of recognition from inputted voice information representing a desired processing by performing voice recognition on the inputted voice information, the candidates of recognition including a first candidate of recognition and other candidates of recognition, executes a processing indicated by the first candidate of recognition while displaying the other candidates of recognition in a menu, and if the processing indicated by the first candidate of recognition is erroneous, executes a correct processing indicated by a correct candidate of recognition selected from the other candidates of recognition displayed in the menu.

22. An information processing system according to claim 21, wherein the first candidate of recognition is a candidate of recognition having a first rank of reliability of recognition of the inputted voice information; and wherein the other candidates of recognition are candidates of recognition having second and lower ranks of reliability of recognition of the inputted voice information.

* * * * *